(12) United States Patent
Reithofer

(10) Patent No.: US 8,129,856 B2
(45) Date of Patent: Mar. 6, 2012

(54) SENSOR ARRANGEMENT AND METHOD OF SUPPLYING POWER TO SENSORS THEREIN

(75) Inventor: Axel Reithofer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1204 days.

(21) Appl. No.: 11/498,286

(22) Filed: Aug. 2, 2006

(65) Prior Publication Data

US 2007/0046102 A1    Mar. 1, 2007

(30) Foreign Application Priority Data

Aug. 2, 2005   (DE) .................. 10 2005 036 287

(51) Int. Cl.
*B60L 3/00*     (2006.01)
*G01M 17/00*   (2006.01)

(52) U.S. Cl. ........................ 307/10.1; 701/34
(58) Field of Classification Search ........... 701/34
See application file for complete search history.

(56) References Cited

U.S. PATENT DOCUMENTS 5,378,866 A * 1/1995 Taneda ................. 219/69.18
5,964,815 A * 10/1999 Wallace et al. .......... 701/45
2004/0024508 A1   2/2004 Sakai et al.

FOREIGN PATENT DOCUMENTS

DE       40 08 105      9/1990
EP        1 323 621      7/2003

* cited by examiner

*Primary Examiner* — Rexford Barnie
*Assistant Examiner* — Hal Kaplan
(74) *Attorney, Agent, or Firm* — Dicke, Billig & Czaja, PLLC

(57) ABSTRACT

One aspect of the invention relates to a method of supplying power to a sensor arrangement including a first sensor and at least one second sensor which in each case have a first and a second supply terminal, and which can be operated in a first and a second operating mode. The first and at least one second sensor can be connected via their supply terminals to a voltage supply arrangement in the first operating mode. The first and at least one second sensor can be connected in series with one another via their supply terminals in the second operating mode and the series circuit with the first and at least one second sensor is connected in series with a current source.

20 Claims, 5 Drawing Sheets

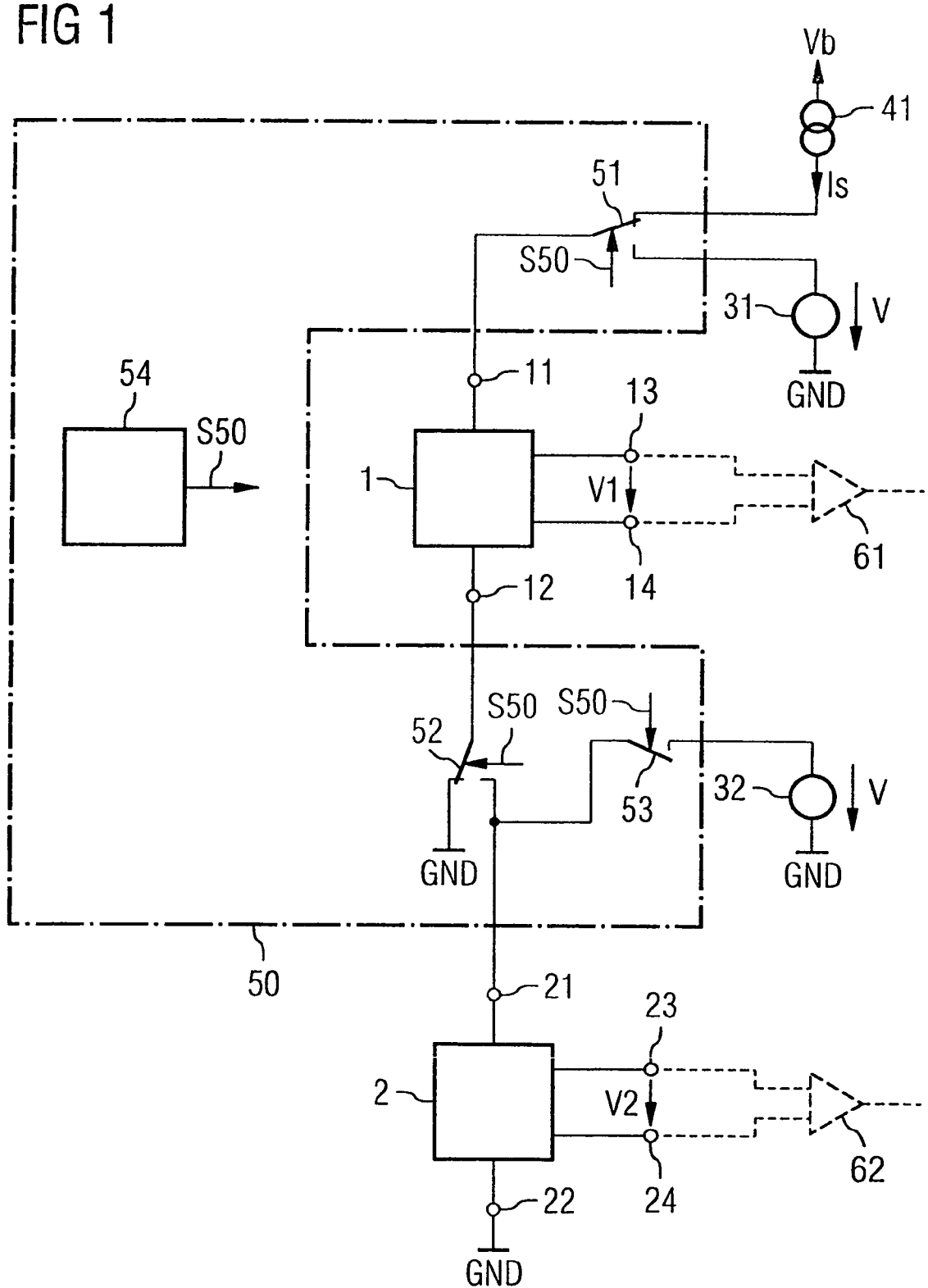

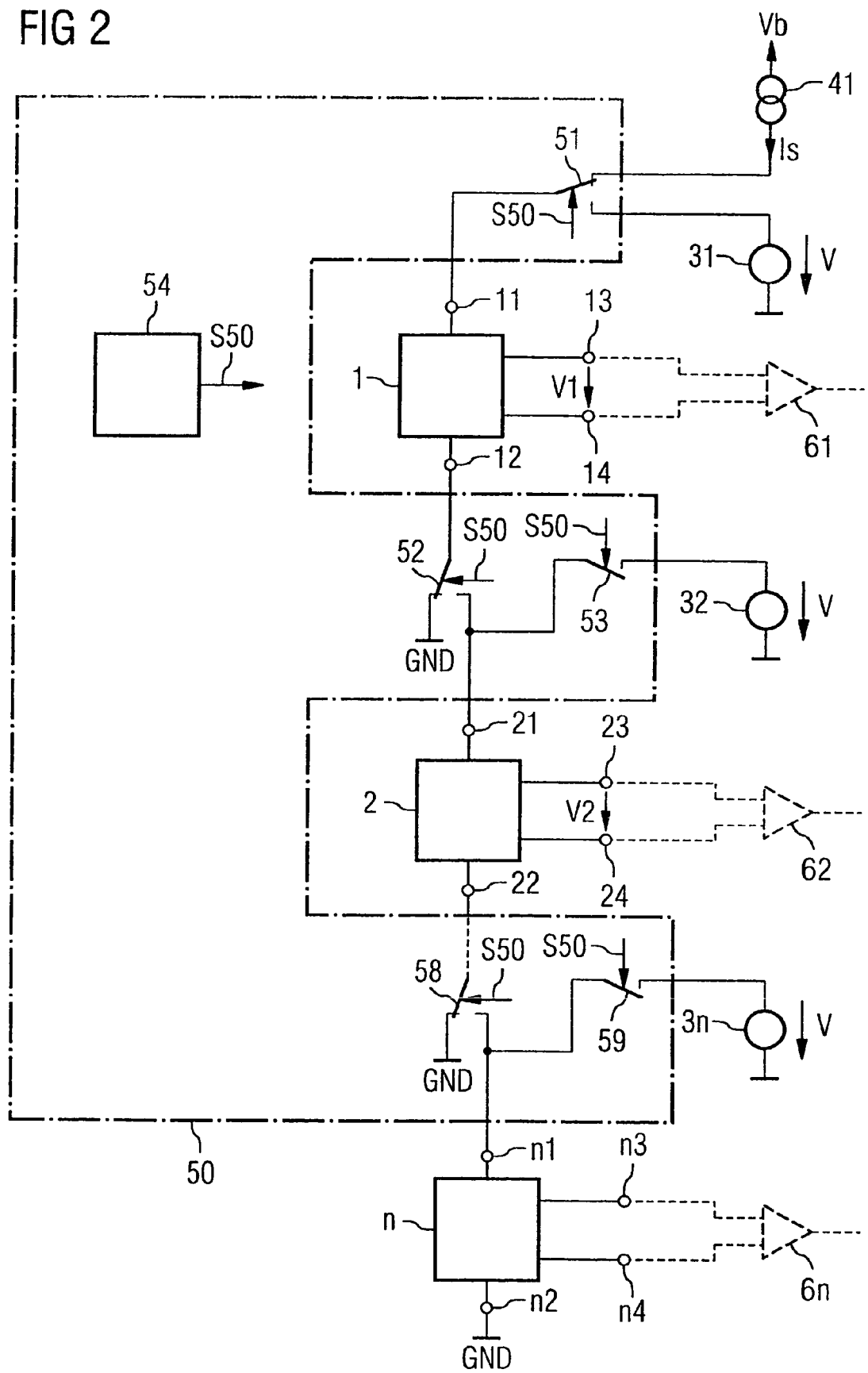

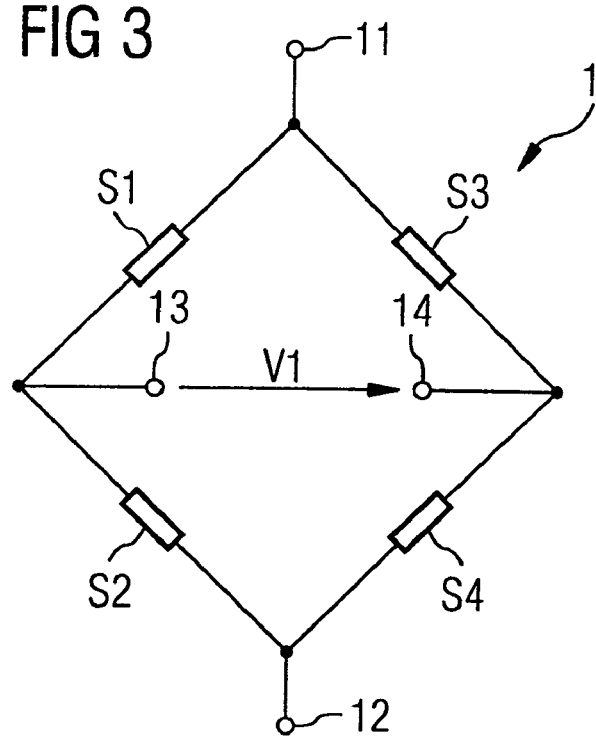
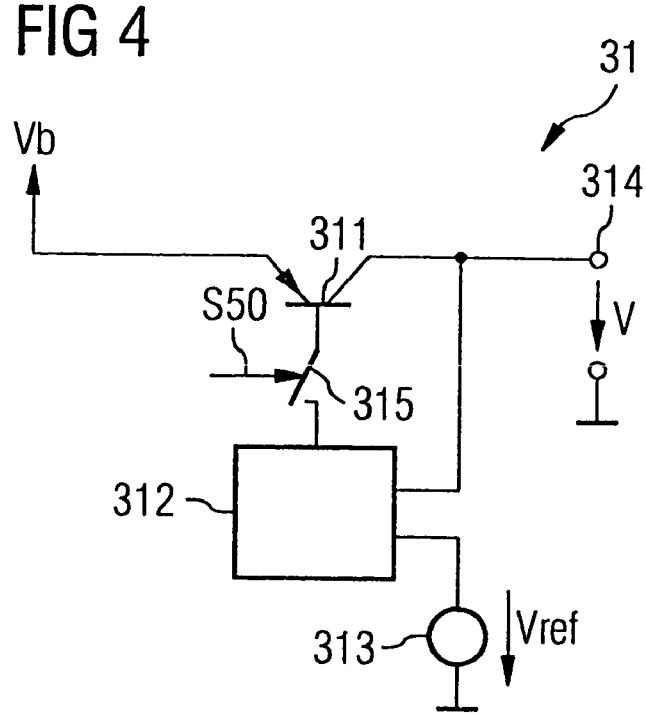

SENSOR ARRANGEMENT AND METHOD OF SUPPLYING POWER TO SENSORS THEREIN

CROSS-REFERENCE TO RELATED APPLICATIONS

This Utility Patent Application claims priority to German Patent Application No. DE 10 2005 036 287.7, filed on Aug. 2, 2005, which is incorporated herein by reference.

BACKGROUND

One aspect of the present description relates to a method of supplying power to a sensor arrangement which has a first and at least one second sensor, and a sensor arrangement having a first and at least one second sensor.

One aspect of the invention relates to sensor arrangements for detecting the steering angle or steering wheel position in an EPS system (electric power steering) for motor vehicles. In such systems, there are a number of sensors for detecting the steering position which need electric power for generating a sensor signal. Such sensors are, for example, gyromagnetic sensors having four sensor elements and at least one magnet. The four sensor elements are connected together to form a full bridge, the center tap of this full bridge forming the output signal of the sensor. In a steering system, the individual sensor elements and the magnet are arranged, for example, in such a manner that the sensor output signal, in the case of a rotating steering wheel or a rotating steering column, corresponds to a sinusoidal signal, the evaluation of which enables the steering wheel position to be determined. Precise evaluation requires that the maximum and minimum values, between which the output signal is sinusoidal, are constant. This is achieved by supplying the sensors, during a normal operating mode of the sensor arrangement, with a constant voltage for supplying power, for example from a voltage control arrangement.

When the vehicle is parked, a precise determination of the steering wheel position is not required, in principle, but it must be possible to recognize whether the steering wheel is completely rotated by one or more revolutions when the vehicle is parked. For evaluating a complete revolution, it is sufficient to evaluate the zero transitions of the sinusoidal sensor signal. The requirements with respect to the amplitude value and the constancy of the amplitude value of the sensor signal are not as high as during normal operation. During this standby mode, much lower amplitudes of the sensor signal than during normal operation are sufficient. The zero transitions of this signal can still be evaluated for detecting complete steering wheel revolutions.

In order to save electrical power during the standby mode, in comparison with normal operation, it is known to disconnect the individual sensors of such a sensor arrangement from the controlled voltage supply during the standby mode and to connect them to in each case a constant current source. The power consumption of this sensor arrangement during standby mode is then dependent on the sum of the currents supplied by the individual constant current sources.

SUMMARY

One aspect of the present invention provides a method for supplying power to a sensor arrangement having at least two sensors that guarantees reduced power consumption during a standby mode of the sensor arrangement, and also provides a sensor arrangement having at least two sensors that have a reduced power consumption during a standby mode or current-saving mode.

In one embodiment, the method for supplying power to a sensor arrangement includes a first sensor and at least one second sensor which in each case have a first and a second supply terminal, which can be operated in a first and a second operating mode. In one case, the method provides for connecting the first and at least one second sensor to a voltage supply arrangement via their supply terminals in the first operating mode and to connect the first and at least one second sensor in series with one another via their supply terminals in the second operating mode and to connect the series circuit with the first and at least one second sensor in series with a current source.

In one method for supplying power to the sensor arrangement, only one current source is required, the current supplied by this current source flowing through the series-connected sensors and supplying the required electrical power which is needed for providing sensor output signals at outputs of the individual sensors.

In one case, the voltage supply arrangement is selected in such a manner that it provides a constant voltage supply at the respective supply terminals of the individual sensors during the first operating mode which corresponds to a normal operating mode of the sensor arrangement. For this purpose, the voltage supply arrangement can have a number of voltage sources corresponding to the number of sensors, one voltage source in each case being connected to in each case one sensor during the first operating mode. In one case, these voltage sources are controlled voltage sources that provide constant supply voltages for the individual sensors.

When ideal current sources are used, the series-connection of the individual sensors during the second operating mode which corresponds to a standby operating mode or current-saving operating mode and the connecting of these individual sensors to only one current source in comparison with connecting the individual sensors to in each case a separate current source does not lead to a reduction in the power consumption of the arrangement. However, current sources or current source arrangements themselves have power losses. Without fail, even the provision of a constant current will lead to power loss in the respective current source, which, in addition to the useful power consumed by the sensor arrangement, contributes to the power consumption of the total arrangement during the standby mode. This power loss is reduced in the method according to one embodiment of the invention in which the sensors are connected in series during the standby mode and are connected to one current source.

In one embodiment, a sensor arrangement suitable for carrying out this method has a first sensor and at least one second sensor which in each case have a first and a second supply terminal. The arrangement also includes a voltage supply arrangement having at least one voltage source, a current source, and a control circuit. The control circuit is constructed for supplying a supply voltage from a voltage supply arrangement to the first and at least one second sensor via their supply terminals in a first operating mode, or to connect the first and at least one second sensor in series with one another via their supply terminals in a second operating mode of the sensor arrangement and to supply a current provided by the current source to the series circuit with the first and at least one second sensor, as determined by a control signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 illustrates a first exemplary embodiment of a sensor arrangement according to the invention with two sensors.

FIG. 2 illustrates an exemplary embodiment of the sensor arrangement having more than two sensors.

FIG. 3 illustrates the configuration of the individual sensors of the sensor arrangement by way of example.

FIG. 4 illustrates an exemplary embodiment of a voltage source of the sensor arrangement.

DETAILED DESCRIPTION

Figure 5:
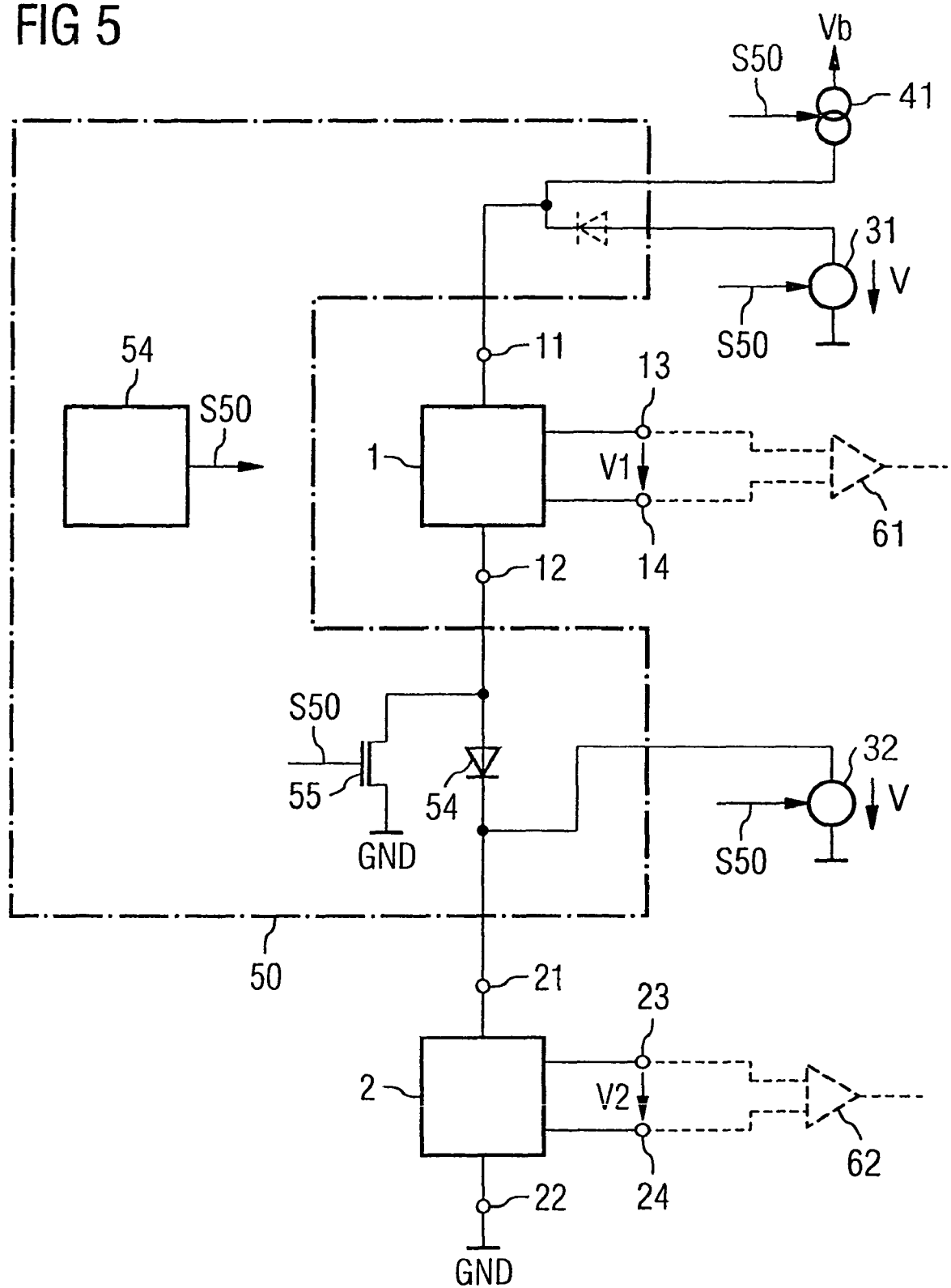
FIG. 5 illustrates a further exemplary embodiment of a sensor arrangement according to the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 illustrates a sensor arrangement which, by way of example, has two sensors, a first sensor 1 and a second sensor 2. The sensors in each case have supply terminals 11, 12 and 21, 22, respectively, for supplying electrical energy, that is, for applying a supply voltage or for supplying a supply current. Sensor signals V1, V2 of the two sensors 1, 2 are in each case available at signal outputs 13, 14 and 23, 24, respectively.

The sensors 1, 2 are, for example, gyromagnetic sensors which are constructed for generating the output signal V1, V2 in dependence on a magnetic field to which the respective sensor 1, 2 is exposed.

To provide better understanding, the basic structure and operation of such a gyromagnetic sensor will be explained by means of the first sensor 1 in FIG. 3 in the text which follows.

Such a sensor 1 has four sensor elements S1, S2, S3, S4 which are interconnected as a full bridge, the full bridge being connected between the supply terminals 11, 12. In the full bridge illustrated, a first and a second sensor element S1, S2 are in each case connected in series between the supply terminals 11, 12, and a third and a fourth sensor element S3, S4 are likewise connected in series between the supply terminals 11, 12. The output signal V1 of the sensor 1 can be picked up via the center tap, operated in open-circuit mode, of the full bridge formed from the individual sensor elements S1-S4. The first signal output 13 of the sensor is formed by the node common to the first and second sensor element S1, S2, and the second signal output 14 is formed by the node common to the third and fourth sensor element S3, S4.

The individual sensor elements S1-S4 have an ohmic resistance which depends on a magnetic field acting on the respective sensor element S1-S4. This magnetic field is generated, for example, by a magnet (not illustrated) which is arranged adjacent to the sensor arrangement. Such sensors are used, for example, for determining the steering wheel position in EPS (electrical power steering) systems. In this arrangement, the individual sensor elements are arranged on the steering column relative to one or more magnets generating a magnetic field, in such a manner that the sensor output signal V1 follows a sinusoidal curve when the steering wheel is rotated. One complete period of this sinusoidal curve can correspond to a complete revolution of the steering wheel but can also correspond to any part-revolution of the steering wheel, for example half a revolution or a quarter revolution, depending on the positioning of the sensors and of the magnets.

Due to the unambiguousness of the signal values of such a sinusoidal curve during one period of the sinusoidal signal, the steering wheel position can be unambiguously determined within a considered angular range corresponding to one period of the sensor signal, if a constant supply voltage is applied to the supply terminals 11, 12.

Referring to FIG. 1, the sensor arrangement for supplying voltage to the sensors 1, 2 has a voltage supply arrangement with two voltage sources, a first voltage source 31 and a second voltage source 32 which in each case generate an identical supply voltage V. These supply voltages V of the two voltage sources 31, 32 are in each case referred to a reference potential GND in the example, that is, one of the terminals of these voltage sources 31, 32 is in each case connected to reference potential GND.

To supply the two sensors 1, 2 with power, a current source 41 with two terminals is also provided, one terminal of which is connected to a supply potential Vb and which is constructed for generating a supply current Is.

The sensor arrangement illustrated can assume two operating modes, a first operating mode and a second operating mode which differ in the type of power supply of the sensors 1, 2. In the first operating mode, the two sensors 1, 2 are supplied with power by applying an at least approximately constant supply voltage to the supply terminals 11, 12 and 21, 22, respectively, of the two sensors 1, 2. For this purpose, the first sensor 1 is connected, via its supply terminals 11, 12, in parallel with the first voltage source 31, and the second sensor 2 is connected, via its supply terminals 21, 22, in parallel with the second voltage source 32.

To connect the two sensors to the voltage sources 31, 32, a switch arrangement 50 having a number of switches 51, 52, 53 is provided. One switch 51, 53 is in each case used for connecting the first supply terminal 11, 21 of the first and second sensors 1, 2 to a supply terminal of the voltage sources 31, 32 away from the reference potential GND. These switches are driven by a control signal S50 which is provided by a control device 54 and which drives the switches 51, 53 in the first operating mode in such a manner that the first supply terminals 11, 21 of the sensors 1, 2 are connected to the voltage sources 31, 32. A further switch 52 which is also driven by the control signal S50 is connected to the second supply terminal 12 of the first sensor 1. This second switch 52 is driven in such a manner that, in the first operating mode, the second supply terminal 12 is driven in such a manner that the second supply terminal 12 is connected to reference potential GND as a result of which the first sensor 1 is in parallel with the first voltage source 31.

As will still be explained in the text which follows, the second supply terminal 22 of the second sensor 2 must be connected to reference potential GND both in the first and in the second operating mode so that a switch corresponding to the switch 52 does not need to be provided at the second supply terminal 22 of the second sensor 2. This second terminal 22 is permanently connected to reference potential GND.

The control device 54 which supplies the control signal S50 for driving the individual switches can be a microprocessor which can still have other functions such as, for example, an evaluation of the sensor signals, in a manner not illustrated.

The first operating mode in which the two sensors 1, 2 are supplied with a constant supply voltage V at their supply terminals 11, 12 and 21, 22, respectively, corresponds to a normal operating mode of the sensor arrangement. In this operating mode, the two sensors 1, 2 generate the sensor signals V1, V2 from the supply voltage supplied.

In a second operating mode which, for example, corresponds to a standby mode of the sensor arrangement, the two sensors 1, 2 are connected in series via their supply terminals 11, 12 and 21, 22, respectively. In this arrangement, the series circuit of the two sensors 1, 2 is connected in series with the current source 41 between the supply potential Vb and reference potential GND. The supply current Is supplied by the current source 41 successively flows through the series-connected sensors 1, 2 and is used for generating the sensor signals V1, V2. The current supplied by the current source Is is in one case selected in such a manner that the power consumption of the sensor arrangement is much less during the second operating mode than the power consumption during the first operating mode. In one case, this current is in the μA range, for example between 50 μA and 100 μA. When the sensors have resistances in the range of some kΩ, signal amplitudes in the mV range are thus achieved in the standby mode. In standby mode, the signal amplitudes of the sensor signals V1, V2 are thus lower than during normal operation. In the case of gyromagnetic sensors which are used, for example, in EPS systems, the demands for accuracy of the sensor signals during standby mode must be lower, however. When the gyromagnetic sensors previously explained with reference to FIG. 3 are used which generate a sinusoidal signal dependent on the steering position, standby mode only requires the zero transitions of this sinusoidal signal to be detected in order to be able to detect, for example, complete revolutions of the steering wheel during the standby mode. Such zero transition detection is still possible even at very low signal amplitudes of the sensor signals V1, V2.

To be able to connect the two sensors 1, 2 in series, the switch 52 connected to the second terminal 12 of the first sensor 1 is constructed as change-over switch and interconnected in such a manner that it connects the second terminal 12 to reference potential GND in the first operating mode and connects this second supply terminal 12 of the first sensor 1 to the first supply terminal 22 of the second sensor 2 in the second operating mode. The switch 51 connected to the first supply terminal 11 of the first sensor 1 is also constructed as change-over switch and is used for switching between the first voltage source 31 and the current source 41. During the second operating mode, this switch 51 assumes a switch position at which the first supply terminal 11 of the first sensor 1 is connected to the current source 41, in dependence on the control signal S50. In the second operating mode, the switch 53 connected to the first supply terminal 21 of the second sensor 2 is opened, in dependence on the control signal S50, in order to disconnect the second sensor 2 from the second voltage source 32. As already explained, the second terminal 22 of the second sensor 2 also remains connected to the reference potential GND in the second operating mode.

Naturally, the invention is not restricted to sensor arrangements having only two sensors but can also include three and more sensors having in each case two supply terminals, these sensors being connected in parallel with voltage supply sources in a first operating mode and being connected in series with one another and in series with a current source in a second operating mode.

FIG. 2 illustrates an exemplary embodiment of a sensor arrangement having more than two sensors. Three sensors of the sensor arrangement are illustrated, the dot-dashed line between the second sensor 2 and the further sensor n indicating that any number of further sensors can be provided. FIG. 2 illustrates the manner in which the combining circuit 50 must be extended, in principle, in order to be able to connect further sensors to the voltage supply arrangement or the current source, respectively. As can be seen, the switch arrangement 50 in each case has two switches 52, 53 and 58, 59, respectively, between two sensors, one of which is used for connecting the first supply terminal 21 or n1, respectively, of one of the sensors 2 or n, respectively, to a terminal of the associated voltage supply source 32 or 3$n$, respectively. The other one of the two switches is used for connecting the second supply terminal 12 or 22, respectively, of one of the two sensors to reference potential GND in the first operating mode or to a first supply terminal 21 or n1, respectively, of the in each case "adjacent" sensor in the second operating mode.

It should be pointed out that the switch arrangement 50 is only illustrated diagrammatically in FIGS. 1 and 2 in order to explain the basic principle of operation of the sensor arrangement in the first and second operating mode.

Figure 6:
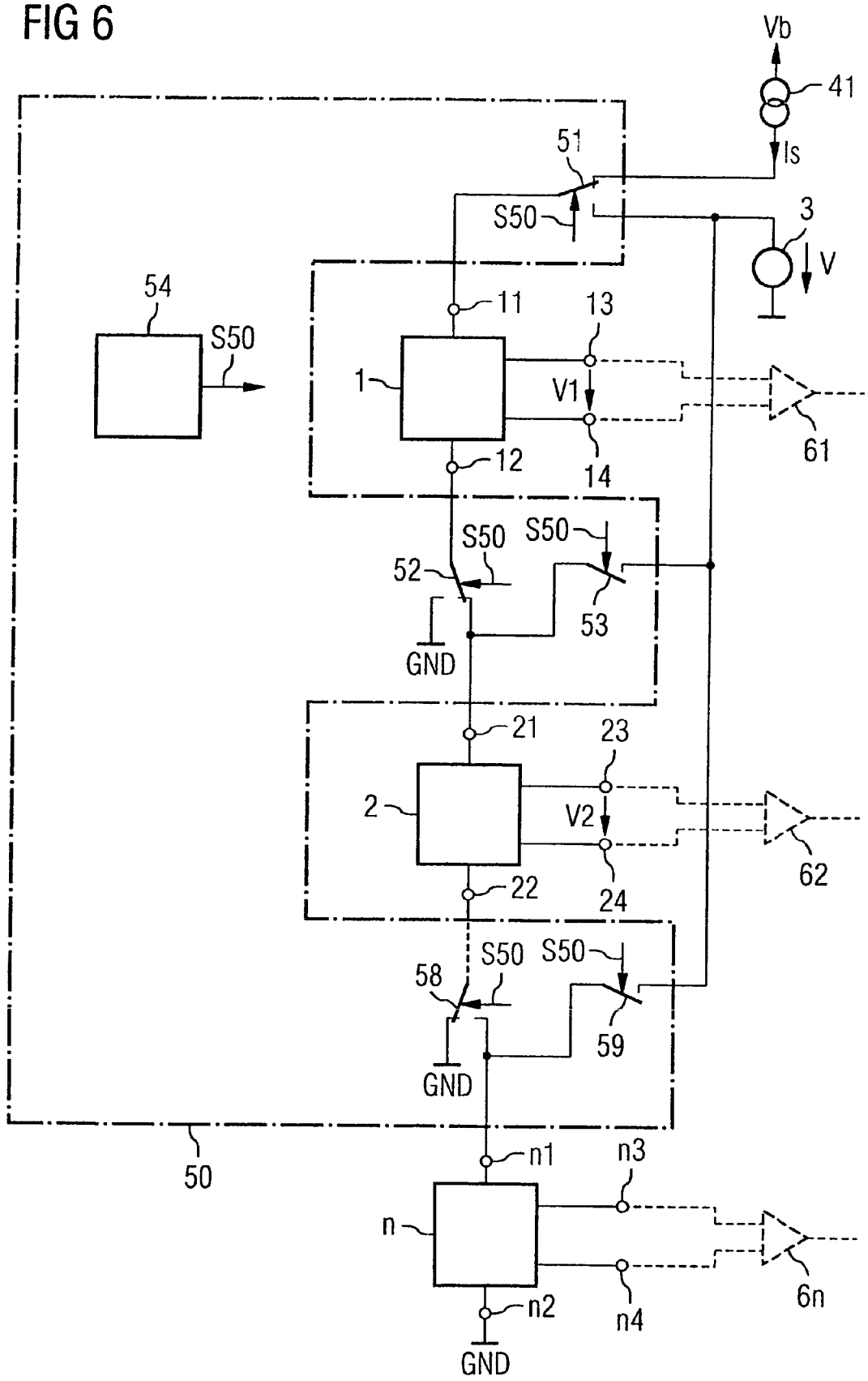
FIG. 6 illustrates an exemplary embodiment of a sensor arrangement according to the invention, in which a voltage supply arrangement has only one voltage source.

In the exemplary embodiments of FIGS. 1 and 2, the voltage supply arrangement in each case has a number of voltage sources 31, 32 and 31, 32, 3n corresponding to the number of sensors 1, 2 and 1, 2, n, respectively. Referring to FIG. 6, it is also possible to provide only one voltage source 3 with which all sensors are connected in parallel via the switch arrangement 50 in normal operating mode. Naturally, "mixed forms" can also be implemented in which in each case two or more sensors share one voltage source so that the number of voltage sources is between one and the number of sensors used.

FIG. 5 illustrates an exemplary embodiment of the sensor arrangement which can be achieved with simple circuitry, the example again being based on the presence of two sensors 1, 2.

In the sensor arrangement illustrated, both the voltage supply sources 31, 32 and the current source 41 are controlled sources which can be switched on or off by the control signal S50 of the control device 54. The control signal S50 switches the voltage sources 31, 32 on, and the current source 41 off, in the first operating mode whereas the control signal switches the current source 41 on and the voltage sources 31, 32 off in the second operating mode.

The first voltage source 31 and the current source 41 are permanently connected to the first supply terminal 11 of the first sensor 1. Since both sources 31, 41 are driven complementarily to one another so that either the current source 41 supplies a supply current Is or the voltage source 31 supplies a supply voltage V, a switch between the sources and the supply terminal 11 can be omitted. In the switched-off state, the voltage source 31 behaves like an open circuit so that the supply current Is of the current source 41 exclusively flows via the first supply terminal 11 of the first sensor 1 in the second operating mode.

A further switch can also be omitted between the second voltage source 32 and the first supply terminal 21 of the second sensor 2 because the voltage source 32 can be switched on and off.

In the example, a "switch-over device" between the second terminal 12 of the first sensor 1 and the first terminal 21 of the second sensor 2 is formed by a rectifier element 54, for example a diode, and a switching transistor 55. The diode 54 is connected in the forward direction between the second terminal 12 of the first sensor 1 and the first terminal 21 of the second sensor 2. The transistor element 55 is driven by the control signal S50 and connected with its load current path between the second terminal 12 of the first sensor 1 and reference potential GND. In the first operating mode, the transistor element 55 is driven to conduct and thus approximately forms a short circuit between the second supply terminal 12 of the first sensor 1 and reference potential GND. This short circuit is in parallel with the series circuit with the diode 54 and the further sensor 2 so that, in the first operating mode, an input current of the first sensor 1, supplied by the first voltage source 31, exclusively flows via the transistor element 55 away to reference potential GND and does not also flow through the further sensor 2. The diode 54 is used for decoupling the two sensors 1, 2 during the first operating mode and ensures that a current from the second voltage source 32 flows exclusively into the second sensor 2 and not also via the second supply terminal 12 of the first sensor 1 into this first sensor 1.

Referring to FIG. 4, the voltage sources 31, 32 are constructed, for example, as voltage controllers which will be explained in greater detail with reference to the voltage source 31. This voltage controller has an output terminal 314 for providing a supply voltage V with respect to reference potential GND. A control transistor 311, which is constructed as pnp bipolar transistor in the example, is connected between a terminal for the supply potential Vb and this output terminal 314. This control transistor 311 is driven by a drive circuit 312 in dependence on a comparison of the output voltage V with a reference voltage Vref which is generated by a reference voltage source 313 in order to correct the output voltage V to a constant value dependent on the reference voltage Vref. To switch this voltage controller on and off, a switch 315 is connected, for example, between the drive circuit 313 and the control transistor 311, which is driven by the control signal S50.

Connecting the individual sensors 1, 2 and 1, 2, n, respectively, in series during the second operating mode has the effect that the sensor signals of the sensors, which are not connected to reference potential in the second operating mode, that is, the first sensor 1 in FIGS. 1 and 5 and the first and second sensor 1, 2 in FIG. 2, have an offset. This offset of the sensor signals of one of the sensors results from the voltage drop across the sensors still following the respective sensor in the direction of the reference potential GND. To evaluate the sensor signals, suitable evaluating circuits must therefore be provided which are capable of processing signals which have an offset. During standby mode, in which it is essentially a matter of evaluating the zero transitions of the sensor signals, such evaluation requires a comparator 61, 62 (illustrated dashed) for each sensor. Normal comparators are capable of also evaluating signals with an offset, that is, signals which are not necessarily referred to a reference potential so that the series circuit of the sensors during the second operating mode usually does not require any further changes of the evaluating circuit following the sensor arrangement.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of supplying power to a sensor arrangement comprising a first sensor and at least one second sensor each having a first and a second supply terminal and which can be operated in a first and a second operating mode, the method comprising:
   connecting the first and the at least one second sensor to a voltage supply arrangement via their supply terminals in the first operating mode; and
   connecting the first and the at least one second sensor in series with one another via their supply terminals in the second operating mode; and
   connecting the series circuit with the first and at least one second sensor in series with a current source.

2. The method of claim 1, further comprising providing the voltage supply arrangement with a number of voltage sources corresponding to the number of sensors and connecting one of the voltage sources between the first and second supply terminals of in each case one sensor in the first operating mode.

3. The method of claim 1, wherein the voltage supply arrangement has a voltage source and wherein the one voltage source is in each case connected between the first and second supply terminals of in each case one sensor in the first operating mode.

4. The method of claim 1, wherein the first operating mode is a normal operating mode and the second operating mode is a standby operating mode.

5. The method of claim 1, further comprising supplying power to steering sensors in a motor vehicle.

6. A sensor arrangement comprising:
   a first sensor and at least one second sensor each having a first and second supply terminal;
   a voltage supply arrangement having at least one voltage source;
   a current source; and
   a switch arrangement for supplying a supply voltage from the voltage supply arrangement to the first and at least one second sensor via their supply terminals in a first operating mode of the sensor arrangement, or connecting the first and at least one second sensor in series with one another via their supply terminals in a second operating mode of the sensor arrangement and supplying a current provided by the current source to the series circuit with the first and at least one second sensor as determined by a control signal.

7. The sensor arrangement of claim 6, wherein the voltage supply arrangement has a number of voltage sources corresponding to the number of sensors and wherein the switch arrangement is constructed for connecting in each case one of the voltage sources between the first and second supply terminals of in each case one sensor in the first operating mode.

8. The sensor arrangement of claim 6, wherein the voltage supply arrangement has a voltage source and wherein the switch arrangement is constructed for connecting the voltage sources between the first and second supply terminals of in each case one sensor in the first operating mode.

9. The sensor arrangement of claim 6, wherein the first operating mode is a normal operating mode and the second operating mode is a current-saving operating mode.

10. The sensor arrangement of claim 6, wherein the first and at least one second sensor are steering sensors of an electric power steering system in a motor vehicle.

11. The sensor arrangement of claim 6, wherein the switch arrangement in each case has between two sensors to be connected in series a switch which is constructed for connecting the second supply terminal of the one sensor to the first supply terminal of the other sensor or connecting the second supply terminal of the one sensor to a reference potential, as determined by the control signal.

12. The sensor arrangement of claim 11, wherein the switch arrangement has for each of the sensors a switch which is constructed for connecting the first supply terminal of the respective sensor to the voltage supply arrangement, as determined by the control signal.

13. The sensor arrangement of claim 12, wherein one of the switches allocated to the sensors is constructed as changeover switch which is constructed for connecting the first supply terminal of the respective sensor to the voltage supply arrangement or the current source, as determined by the control signal.

14. The sensor arrangement of claim 6, wherein the at least one voltage source of the voltage supply arrangement is constructed as a controllable voltage source which is supplied with the control signal.

15. The sensor arrangement of claim 14, wherein the current source is constructed as a controllable current source.

16. A semiconductor arrangement comprising:
a first sensor with a first and a second supply terminal;
a second sensor with a first and a second supply terminal;
a voltage supply arrangement having at least one voltage source and supplying a supply voltage;
means for alternately supplying the supply voltage to the first and second sensor via their supply terminals in a first operating mode and for coupling the first and second sensors together in series via their supply terminals in a second operating mode; and
a current source providing a supplying current to the series circuit of the first and second sensors in accordance with a control signal.

17. The sensor arrangement of claim 16, wherein the voltage supply arrangement has a first and a second voltage source corresponding to the first and second sensors.

18. The sensor arrangement of claim 17, wherein the switch arrangement is configured to couple the first voltage source between the first and second supply terminals of the first sensor in the first operating mode.

19. The sensor arrangement of claim 16, wherein the switch arrangement is configured to couple the voltage source between the first and second supply terminals on the first sensor in the first operating mode.

20. The sensor arrangement of claim 16, wherein the first and at least one second sensor are steering sensors of an electric power steering system in a motor vehicle.

* * * * *